US006860655B2

(12) United States Patent
Miyawaki

(10) Patent No.: US 6,860,655 B2
(45) Date of Patent: Mar. 1, 2005

(54) DRIVING APPARATUS, LIGHT-AMOUNT REGULATING APPARATUS, AND LENS DRIVING APPARATUS

(75) Inventor: Makoto Miyawaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/612,537

(22) Filed: Jul. 2, 2003

(65) Prior Publication Data

US 2004/0062543 A1 Apr. 1, 2004

(30) Foreign Application Priority Data

Jul. 10, 2002 (JP) ........................................ 2002-200993

(51) Int. Cl.$^7$ ................................................. G03B 9/08
(52) U.S. Cl. ........................ 396/451; 396/463; 396/508
(58) Field of Search ................................ 396/449, 451, 396/463–470, 489, 508; 359/819–830

(56) References Cited

U.S. PATENT DOCUMENTS

| 6,719,463 B2 * | 4/2004 | Aoshima | ..................... 396/463 |
| 2003/0062788 A1 | 4/2003 | Aoshima | |
| 2004/0008425 A1 * | 1/2004 | Miyawaki | ..................... 359/738 |

FOREIGN PATENT DOCUMENTS

| JP | 2002-049076 | 2/2002 |
| JP | 2002-051524 | 2/2002 |

* cited by examiner

*Primary Examiner*—David M. Gray
(74) *Attorney, Agent, or Firm*—Cowan, Liebowitz & Latman, P.C.

(57) ABSTRACT

A driving apparatus includes a rotatable rotor with a ring shape, a first magnetic pole portion, a second magnetic pole portion, and a coil for magnetically exciting the first magnetic pole portion and the second magnetic pole portion. The rotor has magnet portions which are divided along a circumferential direction and differently magnetized. The first magnetic pole portion is formed extending in a direction perpendicular to the rotational axis of the rotor, and faces a face of the magnet portion perpendicular to the rotational axis. The second magnetic pole portion sandwiches the magnet portion between the second magnetic pole portion and the first magnetic pole portion, and faces another face of the magnet portion perpendicular to the rotational axis. The coil is disposed radially of the rotor. The condition of $-0.333X+0.9<Y$ is satisfied where Y is a ratio of a central angle of each first magnetic pole portion relative to a central angle of each magnetized pole in the magnet portion, and X is a ratio of an outer circumferential length of each magnetized pole in the magnet portion relative to a thickness of the magnet portion in a direction of the rotational axis.

9 Claims, 17 Drawing Sheets

FIG. 8

|    | STATOR MAX DIAMETER | MAGNET OUTSIDE DIAMETER | NUMBER OF MAGNETIC POLES | MAGNET THICKNESS |
|----|---------------------|-------------------------|--------------------------|------------------|
| 1  | φ19.1mm             | φ14mm                   | 40                       | 0.3mm            |
| 2  | φ19.1mm             | φ14mm                   | 40                       | 0.5mm            |
| 3  | φ19.1mm             | φ14mm                   | 40                       | 0.7mm            |
| 4  | φ23.1mm             | φ18mm                   | 24                       | 0.5mm            |
| 5  | φ23.1mm             | φ18mm                   | 24                       | 0.7mm            |
| 6  | φ23.1mm             | φ18mm                   | 16                       | 0.3mm            |
| 7  | φ23.1mm             | φ18mm                   | 16                       | 0.5mm            |
| 8  | φ23.1mm             | φ18mm                   | 16                       | 0.7mm            |
| 9  | φ13.1mm             | φ8mm                    | 10                       | 0.5mm            |
| 10 | φ13.1mm             | φ8mm                    | 10                       | 0.6mm            |
| 11 | φ13.1mm             | φ8mm                    | 10                       | 0.7mm            |
| 12 | φ21.1mm             | φ16mm                   | 32                       | 0.5mm            |
| 13 | φ21.1mm             | φ16mm                   | 32                       | 0.7mm            |
| 14 | φ21.1mm             | φ16mm                   | 32                       | 0.3mm            |

DRIVING APPARATUS, LIGHT-AMOUNT REGULATING APPARATUS, AND LENS DRIVING APPARATUS

BACKGROUND OF THE INVENTION

1. Field of the Invention

The present invention relates to improvements of a driving apparatus and a light-amount regulating apparatus which are suitably usable in a shutter device and the like provided in an image pick-up apparatus such as a digital camera.

2. Related Background Art

Digital cameras for opto-electrically converting a field image and recording it as information of a still picture image in a recording medium by using a CCD and the like as a pick-up device have been more and more widely used. An example of the operation of exposure of those digital cameras will be discussed in the following.

The main power source is initially turned on prior to photographing to put the pick-up device in its operating condition, and the shutter blade is hence held at its open position capable of exposing the pick-up device. Accordingly, storing, discharging and transferring of electric charges are repeated by the pick-up device, and observation of the object field is made possible by the image monitor.

Upon pushing the release button, stop value and exposure time are determined corresponding to the output of the pick-up device at that time. Accordingly, when the diameter of the exposure aperture needs to be narrowed, the stop blade is driven to be set at a predetermined stop value. Instruction of start of storing electric charges is then sent to the pick-up device from which stored electric charges are discharged. At the same time the circuit for controlling the exposure time begins to operate upon reception of that start instruction as a trigger signal. After the lapse of a predetermined exposure time, the shutter blade is driven to its closed position for intercepting the exposure of the pick-up device. Upon intercepting the exposure of the pick-up device, the stored electric charges begin to be transferred. The picture image information is thus recorded in the recording medium through an image writing apparatus. Exposure of the pick-up device is blocked during the transfer of electric charges to prevent variation of electric charges due to undesired light during this transfer time.

FIG. 16 illustrates a small-sized stop apparatus or shutter apparatus. In the apparatus, a motor for driving the stop blade or the shutter blade is formed in a ring shape, and its inner portion is used as the optical path. Outer diameters of the stop apparatus and shutter apparatus can be hence reduced.

In FIG. 16, reference numeral 101 designates a cylindrical rotor whose outer surface portions are alternately magnetized into N and S magnetic poles. Reference numerals 102a and 102b designate coils which are respectively disposed along the axial direction of the rotor sandwiching the rotor. Reference numerals 103a and 103b designate stators formed of magnetic material. The stator 103a is magnetically excited by the coil 102a, and the stator 103b is magnetically excited by the coil 102b. Each of the stators 103a and 103b is comprised of an outer cylinder and an inner cylinder. The outer cylinder has an outer magnetic pole portion which extends in the axial direction in a planer form, and the outer magnetic pole portion is disposed in a position facing the outer surface of the rotor 101. The inner cylinder also has an inner magnetic pole portion which extends in the axial direction in a planer form, and the inner magnetic pole portion is disposed in a position facing the inner surface of the rotor 101. Reference numerals 104a and 104b designate auxiliary stators which are fixed to the inner cylinders of the stators 103a and 103b, respectively. Reference numeral 105 designates a coupling ring which is formed of non-magnetic material, and serves to couple the stators 103a and 103b to each other with a predetermined phase shift. Upon supplying electric power to the coils 102a and 102b, the outer magnetic pole portions of the stators 103a and 103b and the auxiliary stators 104a and 104b are excited, and the rotor 101 is rotated up to a predetermined position. Reference numeral 106 designates an output ring which is fixed to the inner surface of the rotor 101 and rotates together with the rotor 101. Reference numeral 107 designates a plate on which grooves for engaging with pins on the output ring 106 are formed. Those grooves regulate the rotational range of the output ring 106. Reference numerals 108a and 108b designate shutter blades which engage with the pins of the output ring 106, respectively, and whose opened condition is changed according to the rotational position of the rotor 101.

FIG. 17 illustrates another conventional structure in which the outer diameter of a motor is greatly decreased without making its inner portion hollow.

In FIG. 17, reference numeral 201 designates a cylindrical rotor 201 whose portions 201a and 201b are magnetized to the N and S magnetic poles, respectively. Reference numeral 201c designates an arm formed integrally with the rotor 201. A driving pin 201d extends from the arm 201c in the rotational axial direction of the rotor 201. Reference numeral 202 designates a coil disposed along the axial direction of the rotor 201. Reference numeral 203 designates a stator which is formed of soft magnetic material, and excited by the coil 202. The stator 203 has an outer magnetic pole portion 203a which faces the outer surface of the rotor 201, and an inner cylinder which is inserted into the rotor 201. Reference numeral 204 designates an auxiliary stator which is fixed to the inner cylinder of the stator 203, and faces the inner surface of the rotor 201. Upon supplying electric power to the coil 202, the outer magnetic pole portion 203a and the auxiliary stator 204 are excited, and the rotor 201 is rotated up to a predetermined position. Reference numerals 207 and 208 designate shutter blades, and reference numeral 205 designates a plate. The shutter blades 207 and 208 are respectively rotatable about hole portions 207a and 208a into which pins 205b and 205c of the plate 205 are inserted, respectively. The driving pin 201d slidably engages with elongate holes 207b and 208b. Reference numeral 206 designates a torsion spring which gives elastic force to the rotor 201 such that the driving pin 201d can be pushed against ends of the elongate 207b and 208b. When electric power is supplied to the coil 202 to rotate the driving pin 201d together with the rotor 201 against the elastic force of the torsion spring 206, the shutter blades 207 and 208 are rotated about the hole portions 207a and 208a, respectively. The aperture portion 205a of the plate 205 is thus opened or closed.

SUMMARY OF THE INVENTION

According to one aspect of the present invention, there is provided a driving apparatus which includes a rotatable ring-shaped rotor having magnet portions divided along a circumferential direction and differently magnetized; a first magnetic pole portion formed extending in a direction perpendicular to a rotational axis of the rotor, and facing a face of the magnet portion perpendicular to the rotational axis; and a second magnetic pole portion sandwiching the magnet portion between the second magnetic pole portion and the first magnetic pole portion, and facing another face of the magnet portion perpendicular to the rotational axis. In this driving apparatus, the condition of −0.333X+0.9<Y is satisfied where Y is a ratio of a central angle of each first magnetic pole portion relative to a central angle of each magnetized pole in the magnet portion, and X is a ratio of an outer circumferential length of each magnetized pole in the magnet portion relative to a thickness of the magnet portion in a direction of the rotational axis. In this structure, the rotor can be held at its rotational position due to cogging torque when no current is supplied, and the rotor can be selectively rotated form this rotational position in one of mutually opposite directions by changing the direction of supplied current.

According to another aspect of the present invention, there is provided a light-amount regulating apparatus which includes the above driving apparatus, a plate with an aperture portion, and a light-amount regulating member. In this structure, the amount of light passing through the aperture portion can be regulated by changing a direction of supplied current.

According to yet another aspect of the present invention, there is provided a lens driving apparatus which includes the above driving apparatus, a lens, and a lens holding member. In this structure, the lens can be driven by changing the condition of current supply, and the focal length of a light beam passing through the central portion of the rotor can be changed by changing a direction of supplied current.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 8 is a table describing structures of motor models of FIG. 7;

DESCRIPTION OF THE PREFERRED EMBODIMENTS

Embodiments of the present invention will be hereinafter described with reference to the drawings.

Figure 1:
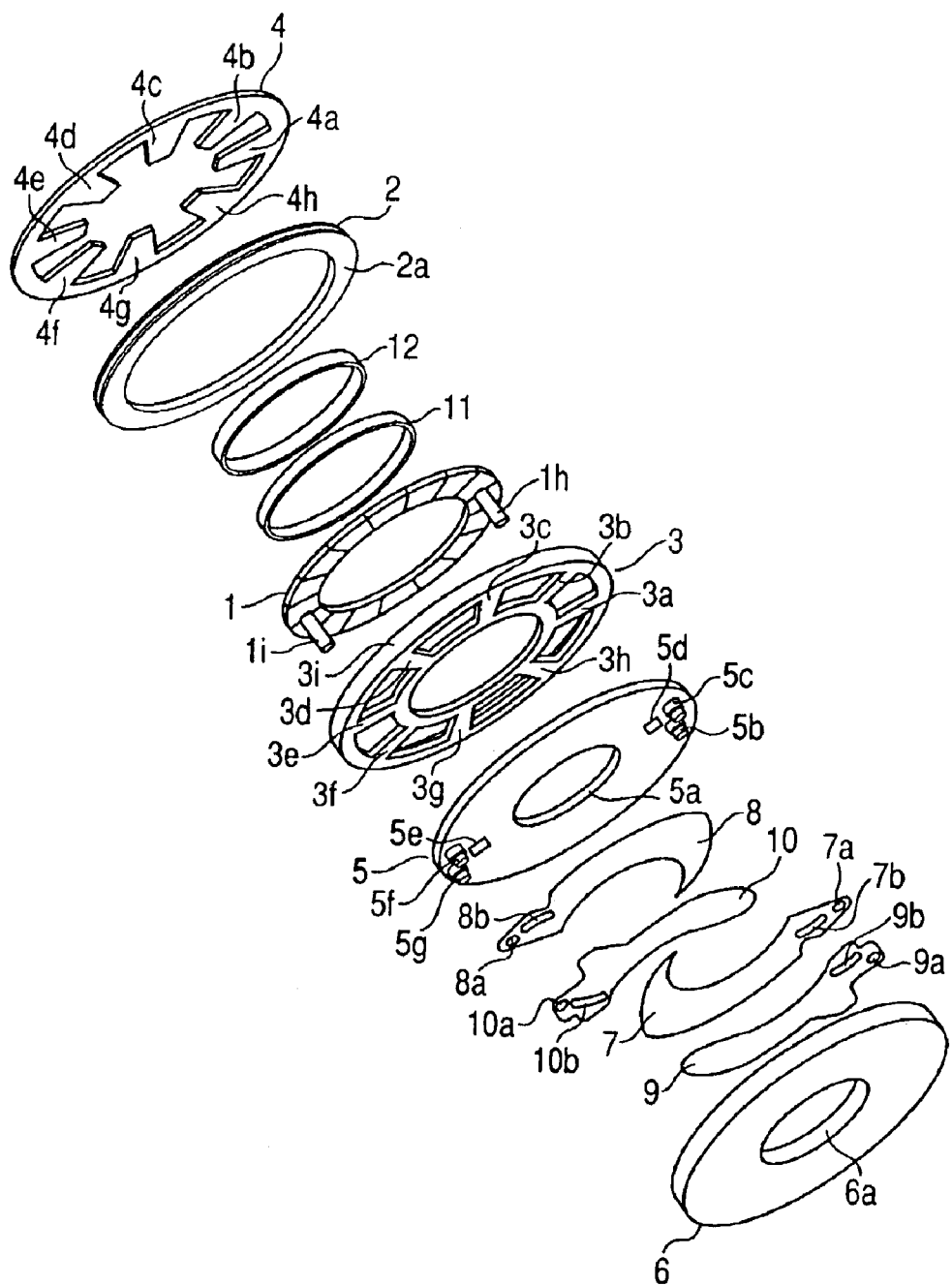
FIG. 1 is a disassembled perspective view illustrating a first embodiment of a light-amount regulating apparatus according to the present invention.
Figure 2:
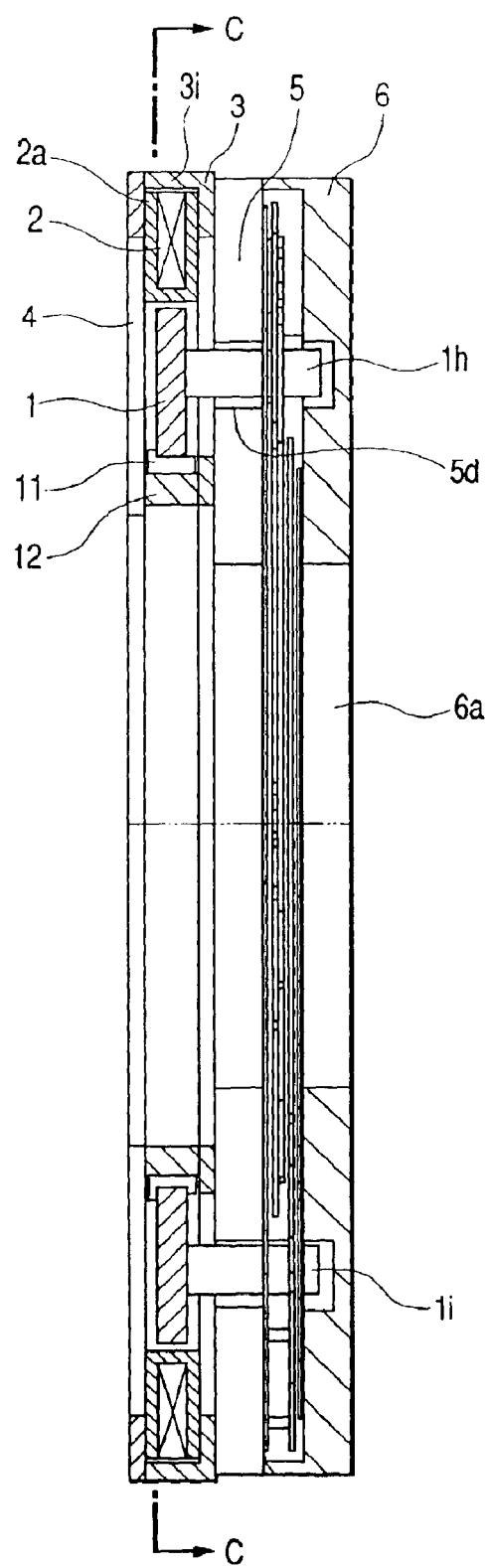
FIG. 2 is a cross-sectional view illustrating the light-amount regulating apparatus of FIG. 1.
Figure 3:
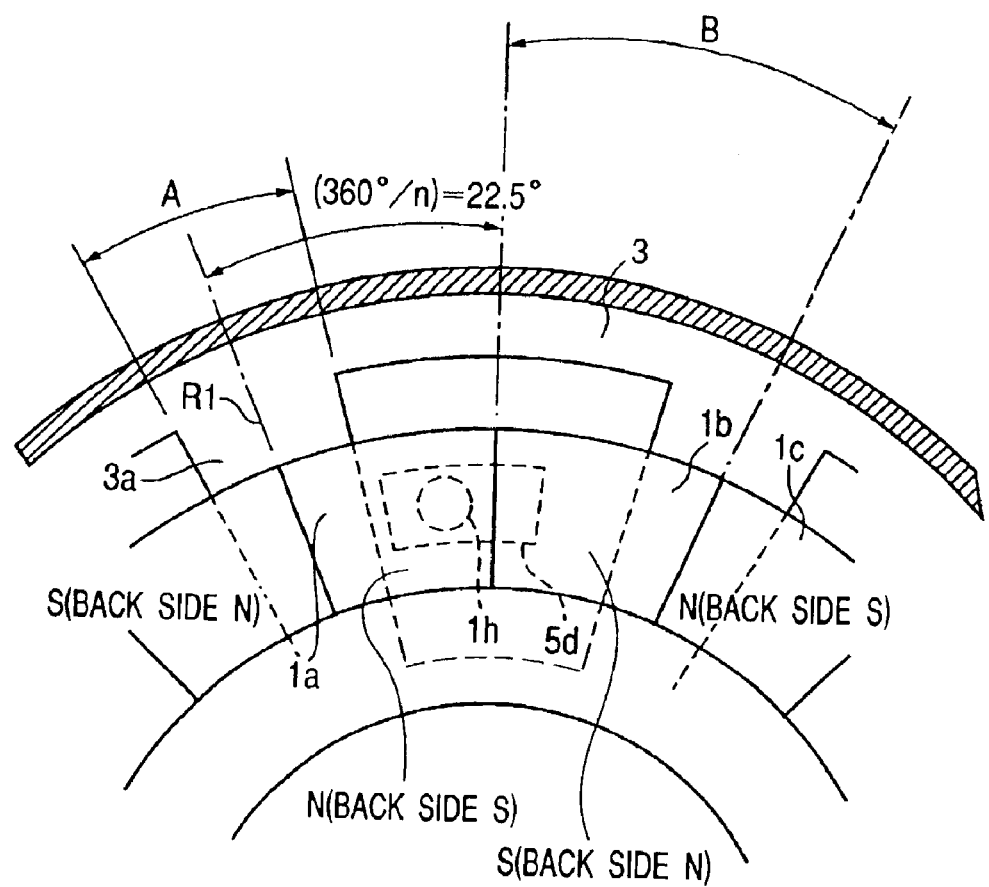
FIG. 3 is a C—C cross-sectional view of FIG. 2 illustrating the condition under which no current is supplied to the coil.
Figure 4:
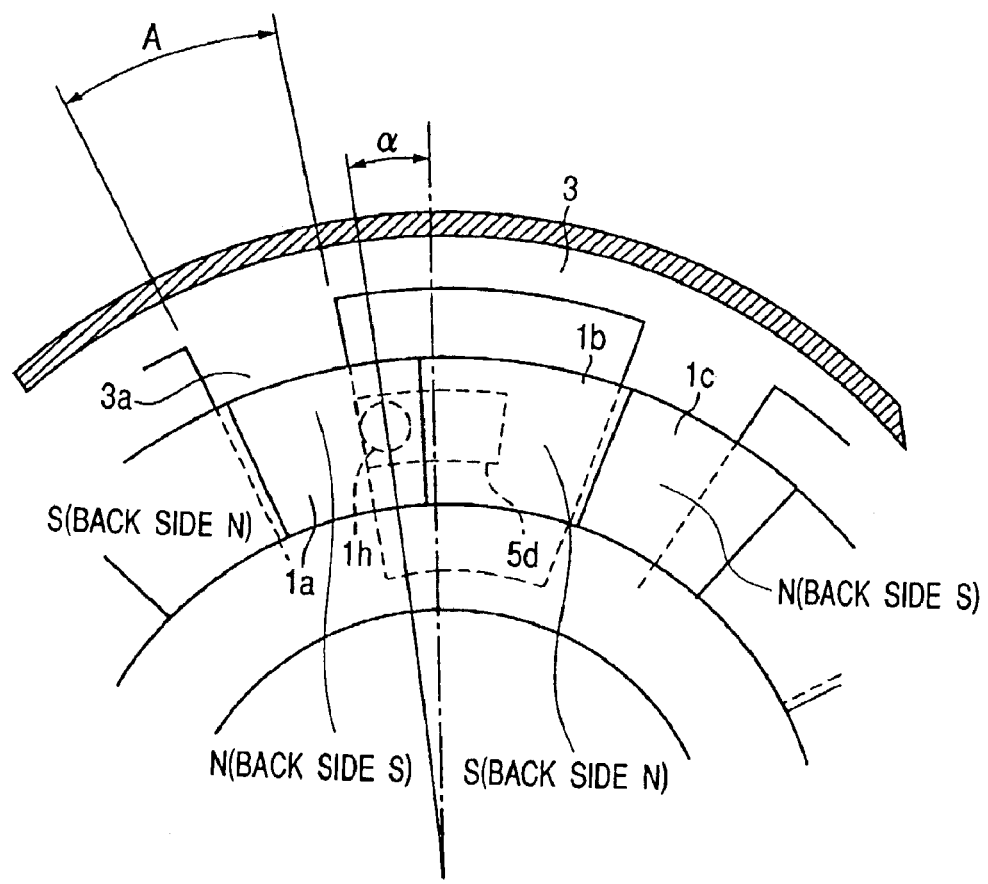
FIG. 4 is a C—C cross-sectional view of FIG. 2 illustrating the condition under which current flowing in a predetermined direction is supplied to the coil.
Figure 5:
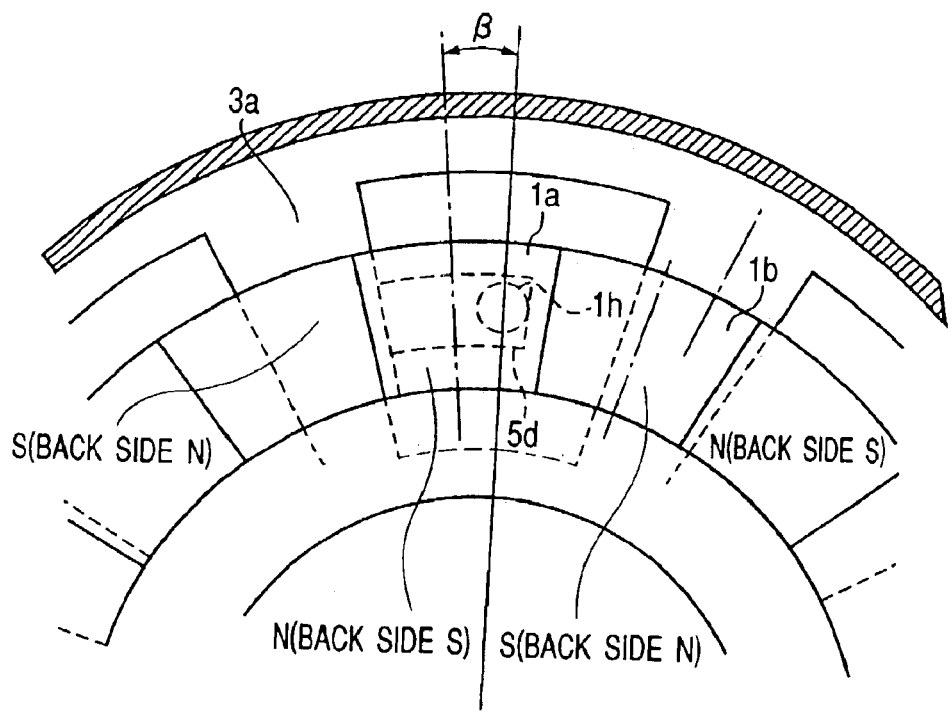
FIG. 5 is a C—C cross-sectional view of FIG. 2 illustrating the condition under which current flowing in a direction opposite to that of FIG. 4 is supplied to the coil.

FIGS. 1 to 5 illustrate a first embodiment of a light-amount regulating apparatus according to the present invention. FIG. 1 is a disassembled perspective view of the light-amount regulating apparatus, FIG. 2 is a cross-sectional view of FIG. 1, FIG. 3 is a C—C cross-sectional view of FIG. 2 illustrating the condition under which no current is supplied to a coil, FIG. 4 is a C—C cross-sectional view of FIG. 2 illustrating the condition under which current flowing in a predetermined direction is supplied to the coil, and FIG. 5 is a C—C cross-sectional view of FIG. 2 illustrating the condition under which current flowing in a direction opposite to that of FIG. 4 is supplied to the coil. In FIGS. 3 to 5, bobbin and coil are not shown, and a portion near a driving pin 1h formed on a magnet 1 (described later) is illustrated in an expanded fashion.

In those figures, reference numeral 1 represents the ring-shaped magnet in the form of a hollow circular plate. The magnet 1 is formed of plastic magnetic material, and rotates about the axis extending through a central location of the ring. Both opposite surfaces of the magnet 1 perpendicular to its rotational axis are alternately magnetized into sixteen (16) N and S magnetic poles along a circumferential direction, respectively. As illustrated in FIG. 3, magnetized portions 1a and 1c are magnetized into the N pole, while magnetized portions 1b and 1d are magnetized into the S pole. Their backside portions are magnetized into opposite magnetic poles, respectively. Reference numeral 2 represents a ring-shaped coil. The coil 2 is disposed adjacent to and on an outer circumferential side of the magnet 1. The coil 2 includes an electrical conductive wire wound on a bobbin 2a formed of electrically-insulating material. The thickness of the bobbin 2a in a direction of the rotational axis is set slightly larger than that of the magnet 1. One coil is sufficient since the driving apparatus of this light-amount regulating apparatus adopts a method of one-phase driving.

Reference numeral 3 designates a first stator formed of soft magnetic material. The first stator 3 includes eight first magnetic pole portions 3a, 3b, 3c, 3d, 3e, 3f, 3g and 3h formed in a 45-degree equiangular form with a space between them. In other words, where the number of the magnetized poles in the magnet 1 is NA, an NA/2 number of the first magnetic pole portions are formed with an angular space of 720/NA degrees between them.

Reference numeral 4 designates a second stator formed of soft magnetic material. The second stator 4 includes eight second magnetic pole portions 4a, 4b, 4c, 4d, 4e, 4f, 4g and 4h formed in a 45-degree equiangular form with a space between them. In other words, where the number of the magnetized poles in the magnet 1 is NA, an NA/2 number of the second magnetic pole portions are also formed with an angular space of 720/NA degrees between them.

A cylindrical coupling portion 3i is formed on an outer circumferential portion of the first stator 3. The coupling portion 3i serves to couple the first stator 3 and the second stator 4 to each other. A portion of the first stator 3 other than its coupling portion 3i and the second stator 4 are formed by planer plates, respectively. Gear-shaped radially-extending magnetic pole portions 3a to 3h and 4a to 4h are formed by providing cutaway portions in those planer plates, respectively. The coil 2 and the magnet 1 are disposed within a space formed by the coupled first and second stators 3 and 4. The first stator 3 and one surface of the magnet 1, and the second stator 4 and the other surface of the magnet 1 are opposed to each other with predetermined spaces therebetween, respectively.

When current is supplied to the coil 2, all the first magnetic pole portions 3a to 3h are magnetized into the same magnetic pole while all the second magnetic pole portions 4a to 4h are magnetized into a magnetic pole opposite to that of the first magnetic pole portions 3a to 3h. The first stator 3 and the second stator 4 are coupled with a common phase such that the first magnetic pole portions 3a to 3h can face the second magnetic pole portions 4a to 4h, respectively. The first and second stators 3 and 4 coupled by the coupling portion 3i, and the coil 2 constitutes a magnetic circuit. It is possible that one of the first stator 3 and the second stator 4 is formed by a planer plate without cutaway portions while only the other stator is provided with magnetic pole portions. Rotational torque is, however, larger in the structure with magnetic pole portions in both the first and second stators 3 and 4 than in the structure discussed right above.

Reference numeral 11 represents a bearing ring fixed to an inner circumferential portion of the magnet 1. Reference numeral 12 represents a bearing fixed between the first stator 3 and the second stator 4. The bearing ring 11 engages with an outer circumferential surface of the bearing 12, and slides on this surface while the magnet 1 continues to be positioned such that predetermined spaces can be created between the magnet 1 and the first stator 3, and between the magnet 1 and the second stator 4, respectively.

Reference numeral 5 represents a plate 5 of the light-amount regulating apparatus. An aperture portion 5a for forming the optical path is formed at a central portion of the plate 5. The first stator 3 is fixed to a surface of the plate 5, and a front plate 6 with an aperture portion 6a is fixed to the other surface of the plate 5. A space is provided between the plate 5 and the front plate 6, and blade members 7, 8, 9 and 10 are disposed in this space.

Two driving pins 1h and 1i are formed on a surface of the magnet 1 facing the first stator 3. Those driving pins 1h and 1i are molded integrally with the magnet 1 of plastic magnet material. Those driving pins 1h and 1i, therefore, can be formed with reduced positional error at relatively low cost, compared with a case where driving pins are separately formed, and thereafter mounted to the magnet. Those driving pins 1h and 1i are inserted into arcuate elongate holes 5d and 5e formed in the plate 5, and can be moved in these elongate holes 5d and 5e along a circumferential direction.

Round holes 7a and 9a of the blade members 7 and 9 rotatably engage with the pins 5b and 5c of the plate 5, respectively, and elongate holes 7b and 9b slidably engage with the driving pin 1h of the magnet 1. Further, round holes 8a and 10a of the blade members 8 and 10 rotatably engage with the pins 5f and 5g of the plate 5, respectively, and elongate holes 8b and 10b slidably engage with the driving pin 1i of the magnet 1. When the magnet 1 is rotated, the blade members 7 and 9 are pushed by the driving pin 1h, and rotated about the round holes 7a and 9a in engagement with the pins 5b and 5c, respectively. The blade members 8 and 10 are also pushed by the driving pin 1i, and rotated about the round holes 8a and 10a in engagement with the pins 5f and 5g, respectively. Accordingly, the size of an aperture portion formed by the blade members 7, 8, 9 and 10 is varied, and hence the amount of light passing through the aperture portion 5a of the plate 5 can be regulated.

According to the above-discussed construction, the thickness in the optical-axis direction of the motor for driving the blade members 7, 8, 9 and 10 only amounts to the sum of the thickness of the bobbin 2a slightly larger than that of the magnet 1, and thicknesses of the first stator 3 and the second stator 4. A drastically thin driving apparatus can be hence constructed. Further, most of magnetic flux flowing from one of the first magnetic pole portion and the second magnetic pole portion flows into the other magnetic pole portion disposed opposingly to the one magnetic pole portion. The magnetic flux, therefore, effectively acts on the magnet 1 interposed between those magnetic pole portions, and large rotational torque can be obtained.

The rotational position of the magnet 1 will be discussed.

FIGS. 3 to 5 are C—C cross-sectional views of FIG. 2, respectively. FIG. 3 illustrates the rotational conduction of the magnet 1 under which no current is supplied to the coil 2. When no current is supplied to the coil 2, no magnetic flux flows from either of the first stator 3 and the second stator 4. The rotational stop position is determined by cogging torque generated between the magnet 1 and the first and second stators 3 and 4, respectively. The cogging torque is attractive force due to magnetic force generated between the magnet 1 and the first and second magnetic pole portions, respectively. FIG. 3, the magnet 1 is stopped by that cogging torque at a position in which the boundary position between adjacent magnetized pole portions (the boundary between the N pole and the S pole) of the magnet 1 faces central locations of the first and second magnetic pole portions.

Upon supplying current to the coil 2 in the state of FIG. 3, the first stator 3 is magnetically excited to the N pole or the S pole according to the direction of the current flow. At the same time the second stator 4 is excited to a magnetic pole opposite to that of the first stator 3. The magnet 1 is hence rotated to a position illustrated in FIG. 4 or FIG. 5.

More specifically, when current in a predetermined direction is supplied to the coil 2 and the first magnetic pole portion of the first stator 3 is excited to the N pole, the magnet 1 is rotated in a counterclockwise direction such that a central position of the S pole on the back side of the magnet 1 (in FIGS. 3, 4 and 5, the back side of the magnet 1 faces the first magnetic pole portion of the first stator 3) can face a central position of the first magnetic pole portion. The magnet 1 is stopped at a position in which the driving pin 1h abuts a side wall of the elongate hole 5d in the plate 5. On the other hand, when current in a direction opposite to that predetermined direction is supplied to the coil 2 and the first magnetic pole portion of the first stator 3 is magnetically excited to the S pole, the magnet 1 is rotated in a clockwise direction such that a central position of the N pole on the back side of the magnet 1 can face the central position of the first magnetic pole portion of the first stator 3. The magnet 1 is hence stopped at a position in which the driving pin 1h abuts the other side wall of the elongate hole 5d in the plate 5.

Figure 6:
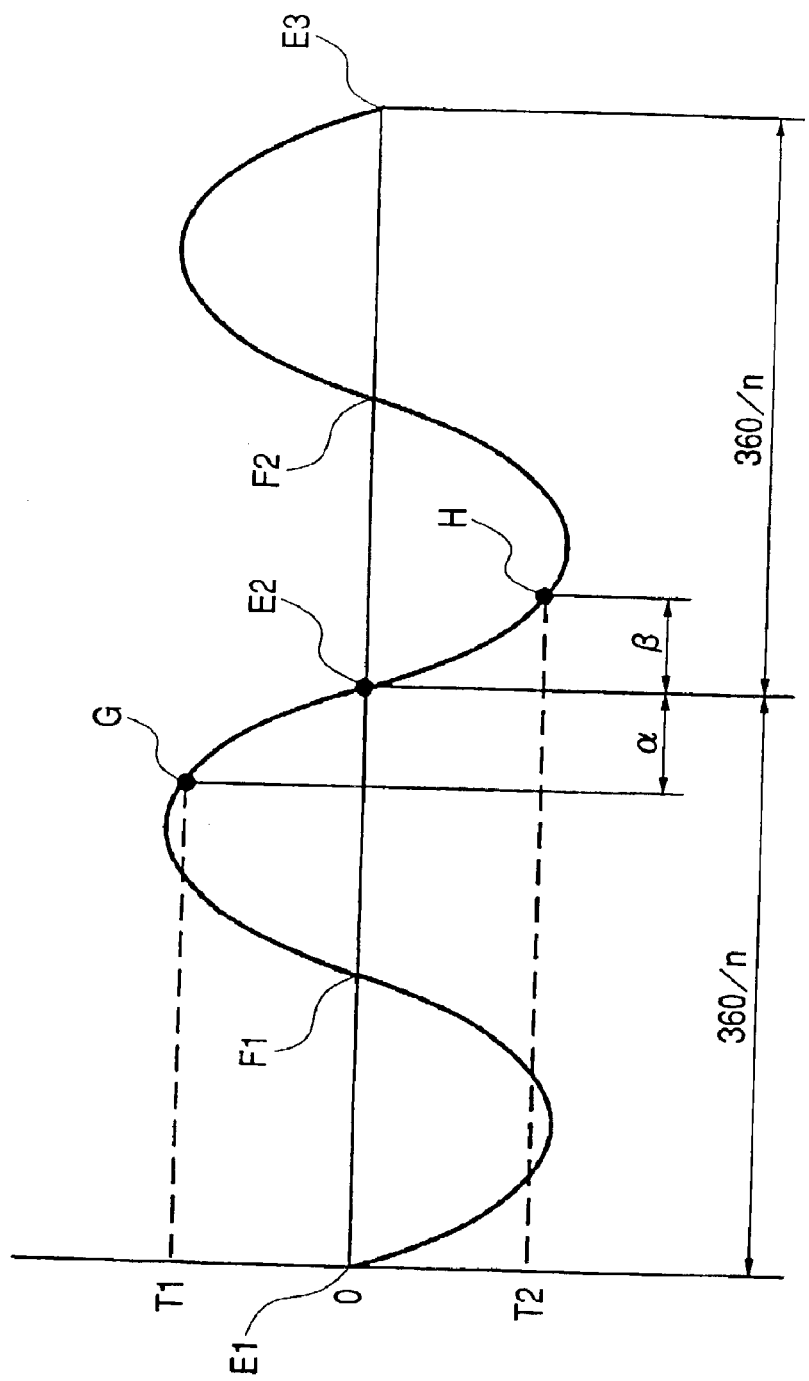
FIG. 6 is a graph showing the relationship between rotational position of the magnet and cogging torque.

FIG. 6 is a graph showing the cogging torque acting between the coil 2 and the first and second stators 3 and 4. Its ordinate represents the magnitude of magnetic force (attractive force) generated between the magnet 1 and the first and second stators 3 and 4, and its abscissa represents the rotational phase of the magnet 1.

When the magnet 1 is in its rotational position indicated by the point E1, E2 or E3, cogging torque capable of rotating the magnet 1 in the counterclockwise direction acts on the magnet 1 if the magnet 1 is going to be rotated in the clockwise direction by external force. Cogging torque capable of rotating the magnet 1 in the clockwise direction acts on the magnet 1 if the magnet 1 is going to be rotated in the counterclockwise direction by external force. Accordingly, the magnet 1 is returned toward the point E2. As a result, when the magnet 1 is in the position indicated by the point E1, E2 or E3, the magnet 1 can be stably held at its position by the cogging torque even if no current is supplied to the coil 2.

The rotational position indicated by the point F1 or F2 is similar to the point E1, E2 or E3 in that the direction of action of cogging torque is switched to its opposite direction at such boundary point, but the action direction of the cogging torque is opposite to that of the point E1, E2 or E3. The magnitude of cogging torque is zero so long as the rotational position of the magnet 1 is coincident with the point F1 or F2. However, if the rotational position deviates from the point F1 or F2 due to slight changes in vibration and posture of the apparatus, cogging torque acts on the magnet 1 to rotate it up to one of the point E1, E2 and E3 closest to the point F1 or F2. Accordingly, considering environment, such as vibration, in which the apparatus is actually used, it is impossible to stably hold the magnet 1 at the point F1 or F2 by the cogging torque.

Rotational positions, such as those indicated by the points E1, E2 and E3, at which the magnet 1 is stably held by the cogging torque exist with intervals of 360/NA, where the number of magnetized poles in the magnet is NA. Intermediate positions between those stable positions are unstable positions such as the points F1 and F2.

From results of the numerical simulation by a finite element method, it becomes apparent that the attractive condition between the first magnetic pole portion and the magnet 1 at the time when no current flow is supplied to the coil varies according to the relationship between the size of the magnet 1, the angle of each magnetized pole in the magnet 1 (a portion B illustrated in FIG. 3 which is the central angle of the magnetized portion in the magnet 1), and the opposing angle of the first magnetic pole portion opposed to the magnet 1 (a portion A illustrated in FIGS. 3 and 4 which is an arcuate central angle formed by the first magnetic pole portion and the rotational center position of the rotor).

According to the above result, positions of the stable points E1, E2 and E3 vary according to the size of the magnet, the central angle of the magnetized portion in the magnet, and the central angle of the first magnetic pole portion. In other words, according to their changes, there separately occur cases where the center of the magnetized portion in the magnet 1 is stably held at a position in which this center faces the center of the first magnetic portion, and cases where the boundary between the magnetized portions in the magnet 1 is stably held at a position in which this boundary faces the center of the first magnetic portion. This situation will be described with reference to FIG. 7.

Figure 7:
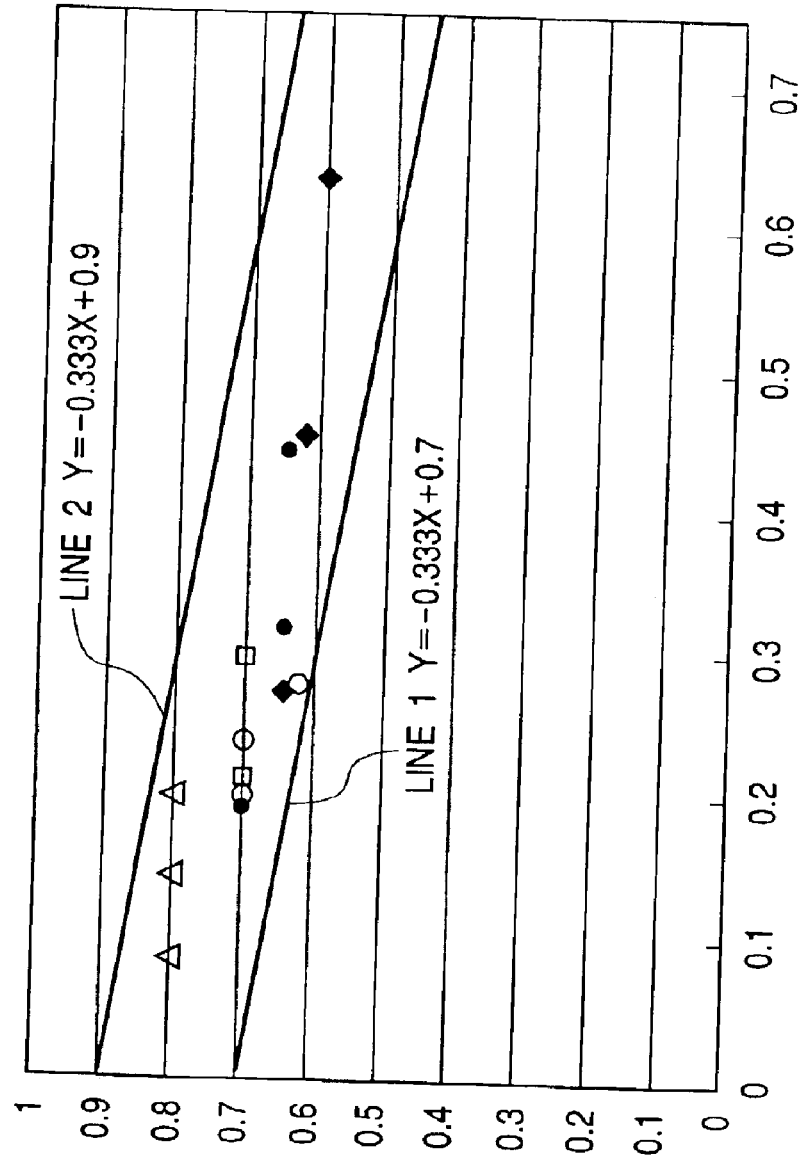
FIG. 7 is a graph showing the relationship between size of the magnet, central angle of the magnetized portion in the magnet, and central angle of the magnetic pole portion in the stator.

In FIG. 7, its abscissa represents a ratio of the thickness of the magnet (the thickness in a direction of its rotational axis) relative to the outer circumferential length of each magnetic pole in the magnet, and its ordinate represents a ratio of the opposing angle of each magnetic pole portion facing the magnet relative to the angle of each magnetic pole in the magnet (i.e., a ratio of the central angle of each magnetic pole portion relative to the central angle of each pole in the magnet).

For example, when the outer diameter of the magnet is 18 mm, its thickness is 0.05 mm, and the number of magnetic poles in the magnet is sixteen (16), the outer circumferential length of each magnetic pole in the magnet is $18 \times \pi/16$, and hence the value on the abscissa of the ratio of the thickness of the magnet relative to the outer circumferential length of each pole in the magnet becomes 0.141. Further, when the central angle of each magnetic pole portion is 13.5 degrees, the value on the ordinate of the ratio of the opposing angle of each magnetic pole portion facing the magnet relative to the angle of each magnetic pole in the magnet becomes 0.600 since the central angle of each pole in the magnet is 22.5 degrees.

In FIG. 7, each plotted point indicates the ratio of the opposing angle of each magnetic pole portion facing the magnet relative to the angle of each pole in the magnet in a model having the smallest cogging torque. FIG. 7 shows the graph of fourteen (14) types of motors described in the table of FIG. 8.

In FIG. 7, where its abscissa X represents the ratio of the thickness of the magnet relative to the outer circumferential length of each pole in the magnet, and its ordinate Y represents the ratio of the opposing angle of each magnetic pole portion facing the magnet relative to the angle of each pole in the magnet, above points fall within a region surrounded with the line 1 approximately defined by $Y=-0.333X+0.7$ and the line 2 approximately defined by $Y=-0.333X+0.9$.

In FIG. 7, in a region below the line 1 (i.e., a region of $Y<-0.333X+0.7$) the center of the pole in the magnet is stably held at a position in which this center faces the center of the magnetic pole portion, and in a region above the line 2 (i.e., a region of $Y>-0.333X+0.9$) the boundary between the poles in the magnet is stably held at a position in which this boundary faces the center of the magnetic pole portion.

In the region surrounded by the line 1 and the line 2 (i.e., where the condition of $-0.333X+0.7<Y<-0.333X+0.9$ is satisfied), the cogging torque becomes smallest, and hence the points E1, E2 and E3 whereat the magnet is stably held do not apparently appear.

Figure 9:
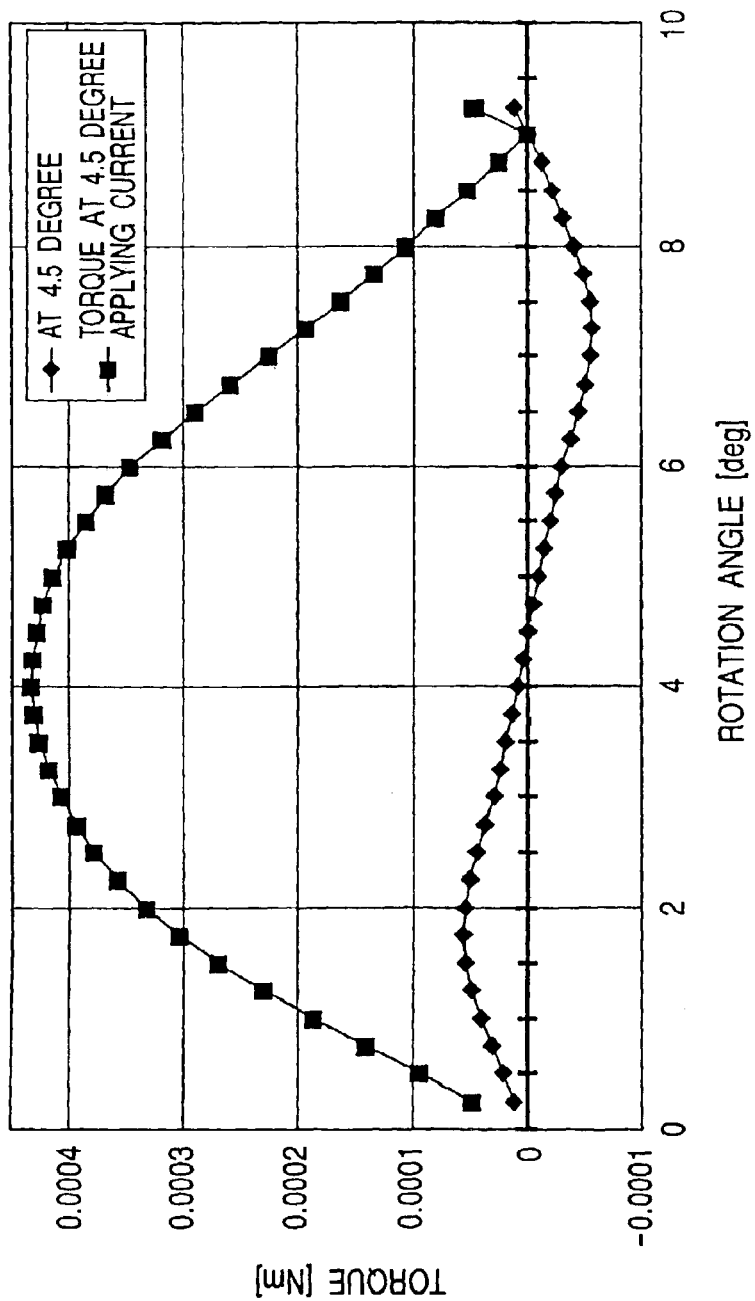
FIG. 9 is a graph showing experimental results of cogging torque, current-supply torque, and rotational phase.
Figure 10:
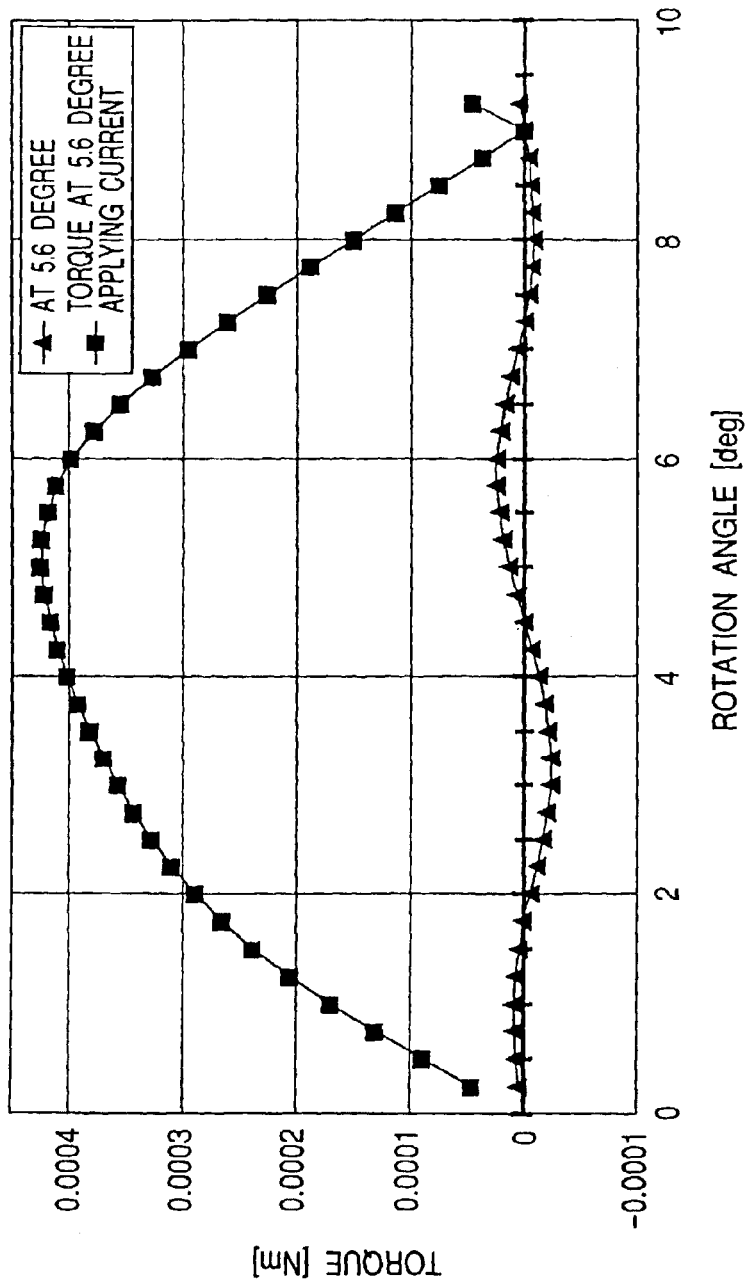
FIG. 10 is a graph showing experimental results of cogging torque, current-supply torque, and rotational phase.
Figure 11:
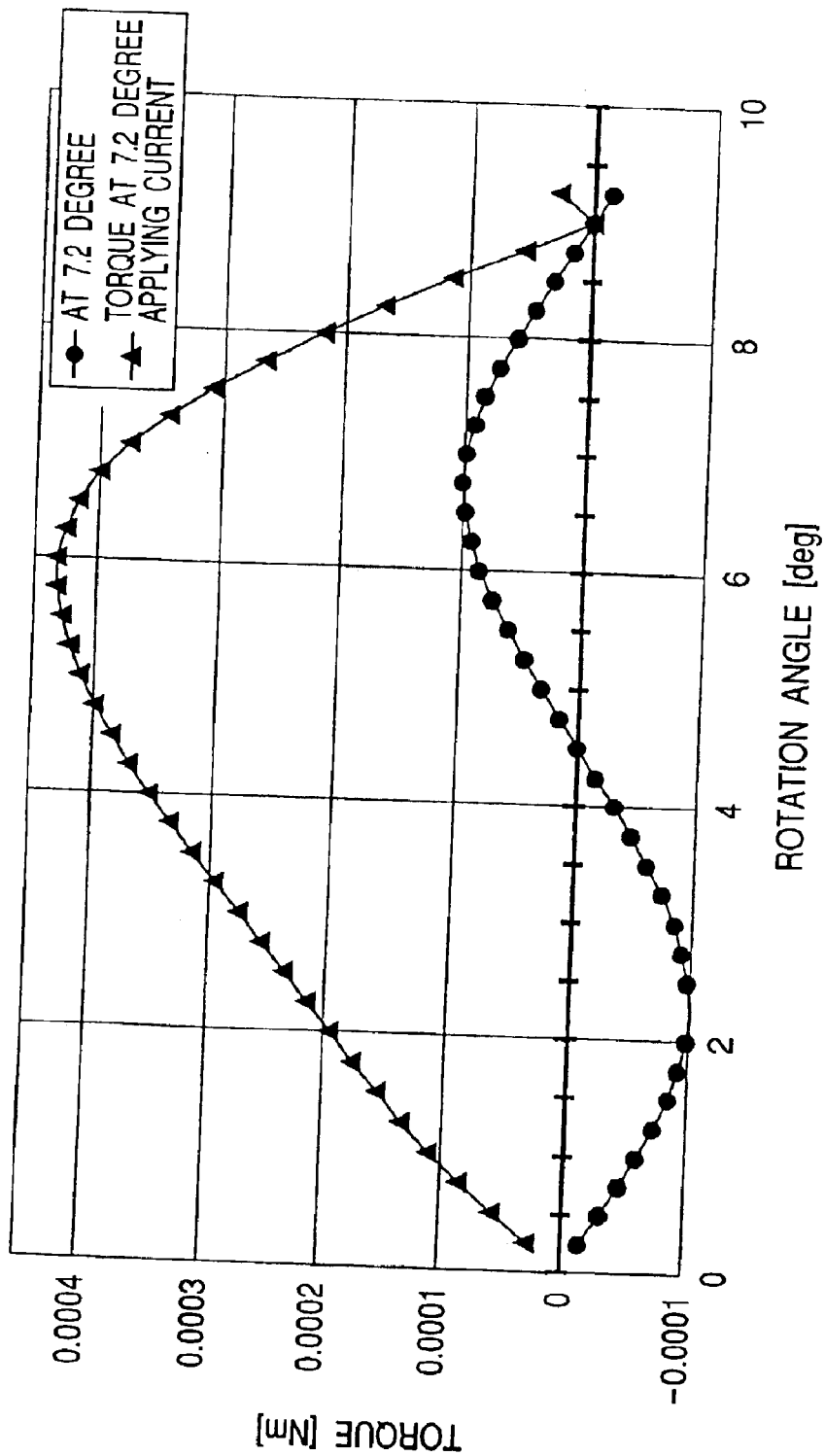
FIG. 11 is a graph showing experimental results of cogging torque, current-supply torque, and rotational phase.

Experimental results are shown in FIGS. 9, 10 and 11.

In FIGS. 9, 10 and 11, similar to FIG. 6, the ordinate represents the magnitude of magnetic force (attractive force) generated between the magnet 1 and the first and second stators 3 and 4, and the abscissa represents the rotational phase of the magnet 1. There are shown cogging torque at the time when no current is supplied to the coil 2, and current-supply torque generated when a voltage of 3 V is applied across terminals of the coil 2. In the motor model, the outer diameter of the magnet is 16 mm, the inner diameter of the magnet is 14 mm, the number of magnetized poles in the magnet is 40, the turn number of the coil is 105 turns, the resistance is 1065 Ω, and the outer diameter of the stator is 19.1 mm.

In FIG. 9, the central angle of the magnetic pole portion (indicated by A in FIGS. 3 and 4) is 4.5 degrees, X=0.455, and Y=0.50. In FIG. 10, the central angle of the magnetic pole portion is 5.63 degrees, X=0.455, and Y=0.625. In FIG. 11, the central angle of the magnetic pole portion is 7.2 degrees, X=0.455, and Y=0.80.

Figure 12:
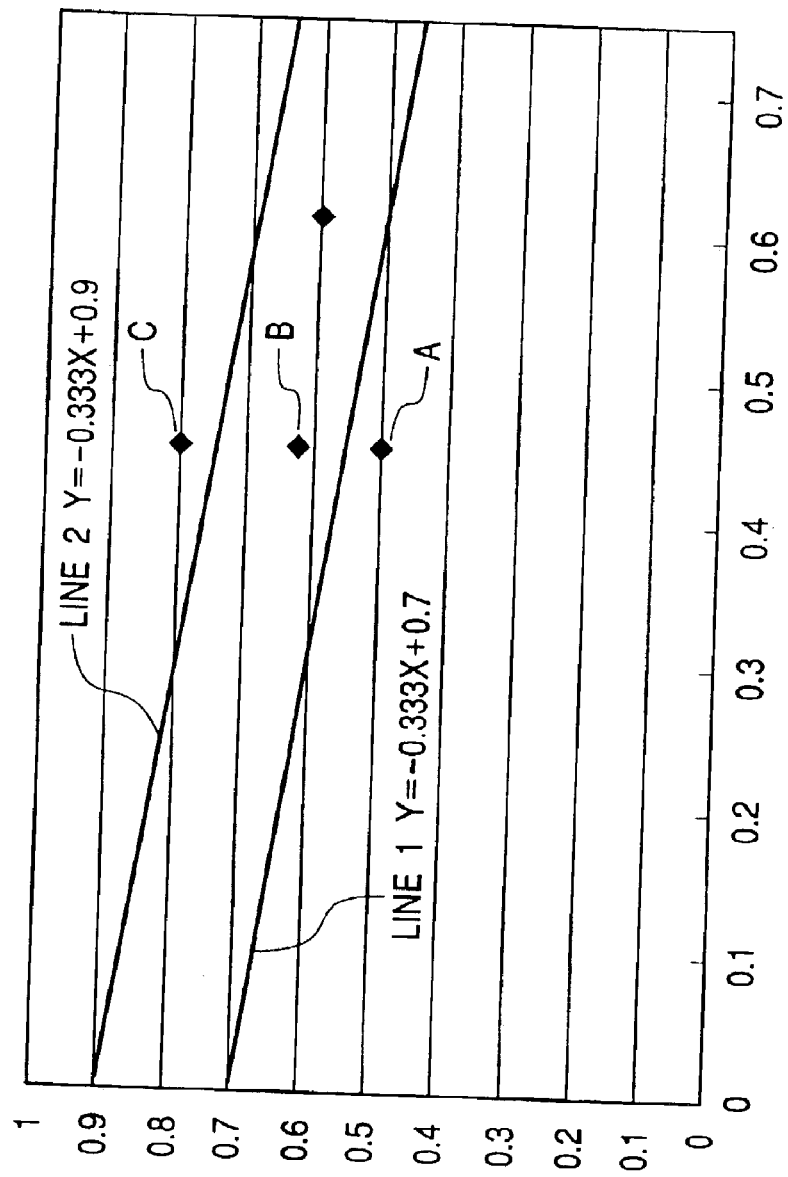
FIG. 12 is a graph showing the relationship between size of the magnet of an experimental motor model, central angle of the magnetized portion in this magnet, and central angle of the magnetic pole portion in the stator of this motor model.

In FIG. 12 illustrating the lines 1 and 2, structures of FIGS. 9, 10 and 11 are indicated by A, B and C, respectively.

In the apparatus having structural characteristics shown in FIG. 9 (i.e., the apparatus in which the central angle A of the magnetic pole portion is 4.5 degrees), X=0.455 and Y=0.50. Therefore, the condition of Y<−0.333X+0.7 is satisfied, and the stable position of the magnet is a position in which the pole center of the magnetized portion faces the center of the magnetic pole portion.

In the apparatus having structural characteristics shown in FIG. 10 (i.e., the apparatus in which the central angle A of the magnetic pole portion is 5.63 degrees), X=0.455 and Y=0.50. Therefore, the condition of −0.333X+0.7<Y<−0.333X+0.9 is satisfied, and the cogging torque is very small.

In the apparatus having structural characteristics shown in FIG. 11 (i.e., the apparatus in which the central angle A of the magnetic pole portion is 7.2 degrees), X=0.455 and Y=0.80. Therefore, the condition of Y>−0.333X+0.9 is satisfied, and the stable position of the magnet is a position in which the boundary between poles of the magnetized portions faces the center of the magnetic pole portion.

In the above-discussed first embodiment, the size of the driving apparatus is set so as to satisfy Y>−0.333X+0.9. Accordingly, when no current is supplied to the coil 2, the points E1 and E2 are positions in which the boundary between the magnetized portions in the magnet 1 faces the center of the magnetic pole portion in the stator 4. The magnet 1 is hence stably held at this position even if no current is supplied to the coil 2. Therefore, when the magnet 1 is in this position, it is preferable to set the blade member to take a stand-by position, for example, its intermediate stop condition that is frequently used. If this adjustment is done, this condition can be set without increasing power consumption, and in addition thereto power consumption can be reduced in the entire apparatus.

Where the boundary between the magnetized portions in the magnet 1 takes the position facing the center of the magnetic pole portion, force for rotating the magnet 1 is generated to drive the magnet if current is supplied to the coil 2 to magnetize the magnetic pole portion. The direction of rotation of the magnet 1 can be controlled by controlling the direction of current supplied to the coil 2.

In the state of FIG. 3, when current in a predetermined direction is supplied to the coil 2 such that the magnetic pole portion 3a of the first stator 3 can be magnetized into the N pole while the magnetic pole portion (not shown) of the second stator 4 facing the magnetic pole portion 3a can be magnetized into the S pole, the center of the pole (its back side is in the S pole) in the magnet 1 is thereby attracted toward the central position R1 of the magnetic pole portion 3a. The magnet 1 thus begins to rotate smoothly in the counterclockwise direction. Rotation of the magnet 1 stops when the driving pin 1h (1i) of the magnet 1 abuts one side wall of the elongate hole 5d (5e) provided in the plate 5 for regulation of rotation of the magnet 1, as illustrated in FIG. 5. Where the amount of rotation of the magnet 1 is β degrees, that state is a position indicated by the point H in FIG. 6. The cogging torque at this position is T2, and this means that force for returning the magnet toward the point E2 (force in the clockwise direction in FIG. 5) acts on the magnet. Therefore, if current flow to the coil 2 is stopped in the state of FIG. 5, the magnet 1 is rotated β degrees in the clockwise direction, and returned to the point E2 that is the state of FIG. 3.

On the other hand, in the state of FIG. 3, when current in a direction opposite to the above predetermined direction is supplied to the coil 2 such that the magnetic pole portion 3a of the first stator 3 can be magnetized into the S pole while the magnetic pole portion (not shown) of the second stator 4 facing the magnetic pole portion 3a can be magnetized into the N pole, the center of the pole (its back side is in the N pole) in the magnet 1 is thereby attracted toward the central position R1 of the magnetic pole portion 3a. The magnet 1 thus begins to rotate smoothly in the clockwise direction. Rotation of the magnet 1 stops when the driving pin 1h (1i) of the magnet 1 abuts the other side wall of the elongate hole 5d (5e) provided in the plate 5 for regulation of rotation of the magnet 1, as illustrated in FIG. 4. Where the amount of rotation of the magnet 1 is α degrees, that state is a position indicated by the point G in FIG. 6. The cogging torque at this position is T1, and this means that force for returning the magnet toward the point E2 (force in the counterclockwise direction in FIG. 4) acts on the magnet. Therefore, if current flow to the coil 2 is stopped in the state of FIG. 4, the magnet 1 is rotated α degrees in the counterclockwise direction, and returned to the point E2 that is the state of FIG. 3.

When α and β are set such that unstable positions F1 and F2 adjacent to the stable position E2 in FIG. 6 cannot fall within ranges of α and β, the magnet 1 is always held at the position of the point E2 due to the cogging torque if no current is supplied to the coil 2. The magnet 1 is held at the point H (the position rotated β degrees from the point E2), or G (the position rotated α degrees from the point E2) due to the cogging torque only when current is continuously supplied to the coil 2.

Cases where points F1 and F2 fall within a range over which the magnet 1 can rotate will be described. Since the points F1 and F2 exist at intermediate positions between the stable positions E1, E2 and E3 as discussed above, the state in which the central position of the magnetized portion in the magnet 1 faces the central position of the magnetic pole portion in the stator corresponds to the rotational position F1 or F2. When current is supplied to the coil 2, the magnet 1 is rotated to a position corresponding to the point F1 or F2, and held thereat since the central position of the magnetized portion of the magnet 1 tends to face the central position of the magnetic pole portion in the stator. When current supply to the coil 2 is stopped, the magnet 1 is held at this position unless external influence of vibration occurs. Even if current is again supplied to the coil 2, equivalent torques in clockwise and counterclockwise directions are applied to the magnet 1, and therefore the magnet cannot begin to rotate. Actually, the rotational position of the magnet 1 is liable to deviate from the point F1 or F2 due to vibration and the like, and cogging torque for rotating the magnet 1 in either direction is generated. It is, however, impractical because time lag in rotation of the magnet 1 occurs from the control of current supply to the coil 2 if the external influence of vibration and the like is relied upon. Further, accuracy is lacking since it is uncertain in which rotational direction the magnet 1 deviates due to such influence. For those reasons, it is preferable to set the rotational range of the magnet 1 such that the central position of the magnetized portion in the magnet 1 cannot face the central position of the magnetic pole portion of the stator, namely, such that this rotational range does not contain the points F1 and F2 adjacent to the stable point E2.

As discussed above, the condition of the magnet 1 can be changed over between the state of FIG. 4 and the state of FIG. 5 by changing the direction of current supply to the coil 2. When current supply to the coil 2 is stopped in either state described right above, the magnet 1 is rotated to the state of FIG. 3, and is stably held thereat due to the cogging torque.

As described in the foregoing, the blade members 7 to 10 are rotated in interlocking relationship with the magnet 1. When the magnet 1 is in the state of FIG. 3, the blade members 7 to 10 take positions which achieve a predetermined stop or an intermediate stop diameter. The amount of light passing through the aperture portion 5a of the plate 5 is thus restricted. When the magnet 1 is in the state of FIG. 4, the blade members 7 to 10 take positions in which they are retracted from the aperture portion 5a of the plate 5. The maximum amount of light hence passes through the aperture portion 5a of the plate 5. On the other hand, when the magnet 1 is in the state of FIG. 5, the blade members 7 to 10 are closed. In this state, no light can pass through the aperture potion 5a. Accordingly, when the condition of current supply to the coil 2 and its direction are changed, it is possible to control the positions of the blade members 7 to 10 between open positions (maximum aperture diameter), intermediate stop positions, and closed positions (minimum aperture diameter). The amount of light passing through the aperture portion 5a of the plate 5 can be thus changed between those three conditions. Further, the apparatus is advantageous in power consumption since the intermediate stop position is maintained due to the attractive force (cogging torque) generated between the magnet 1 and the magnetic pole portion when no current is supplied to the coil 2.

Furthermore, the lens can be arranged within the light-amount regulating apparatus by making this apparatus in a ring shape.

Figure 13:
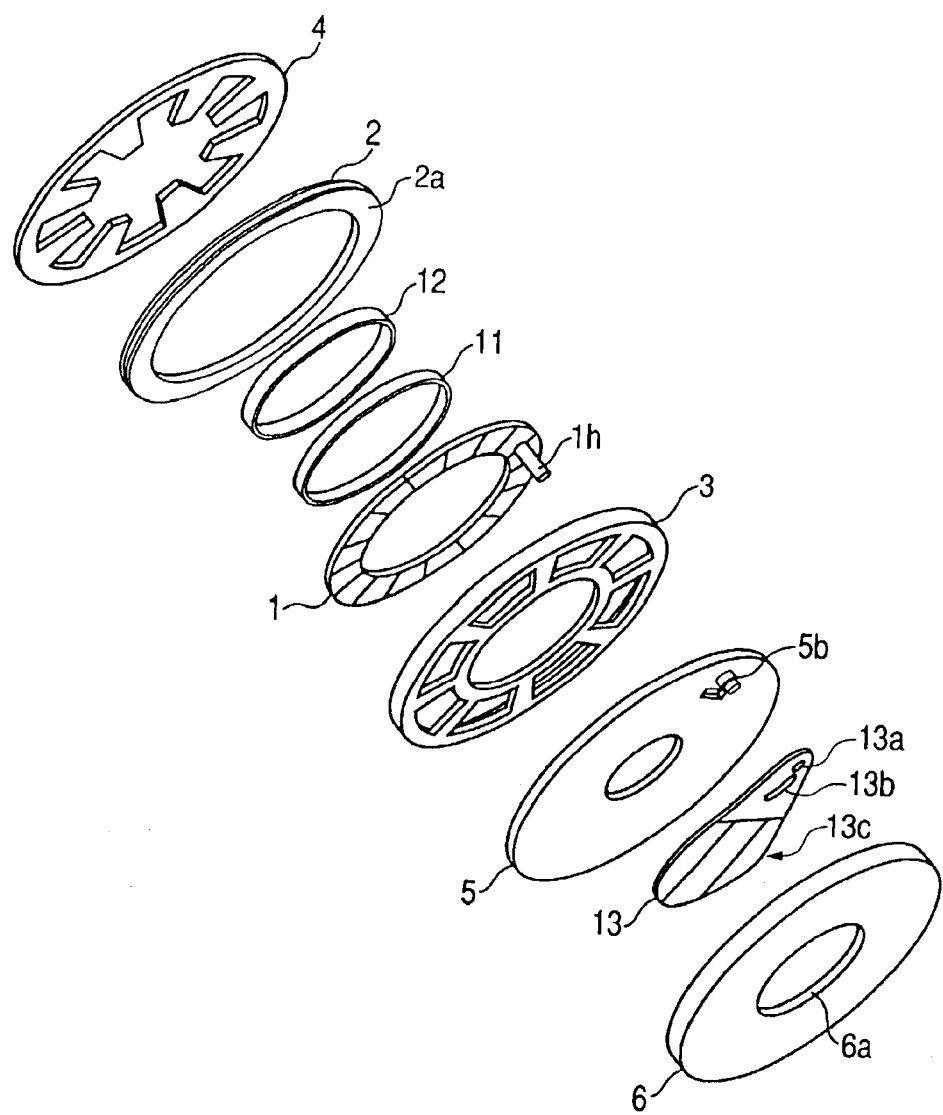
FIG. 13 is a disassembled perspective view illustrating a second embodiment of a light-amount regulating apparatus according to the present invention.

FIG. 13 is a disassembled perspective view illustrating a second embodiment of a light-amount regulating apparatus according to the present invention. In FIG. 13, portions having equivalent functions to those of the first embodiment are designated by the same reference numerals as those of the first embodiment, and detailed description thereof will be omitted.

While the first embodiment relates to the light-amount regulating apparatus in which the positions of the blade members 7 to 10 can be controlled between open positions (maximum aperture diameter), intermediate stop positions, and closed positions (minimum aperture diameter), the second embodiment relates to a light-amount regulating apparatus in which the amount of light entering an image pick-up device is regulated according to luminance of the object field. In the light-amount regulating apparatus of the second embodiment, an ND (neutral density) filter plate including an ND filter with three grades of density is driven in interlocking relationship with rotation of the magnet 1, and the amount of light passing through the aperture portion 5a is regulated by changing the condition of light entering the aperture portion.

Reference numeral 13 designates the ND filter plate which is a light-amount regulating member. A round hole 13a of the filter plate 13 rotatably engages with the pin 5b of the plate 5, and an elongate hole 13b slidably engages with the driving pin 1h of the magnet 1. Similar to the blade members 7 to 10 of the first embodiment, when the magnet 1 is rotated, the ND filter plate 13 is pushed by the driving pin 1h, and rotated about the round hole 13a engaging with the pin 5b. The ND filter 13c disposed in front of the aperture portion 5a of the plate 5 is thereby changed over such that the amount of light passing through the aperture portion 5a can be regulated.

When no current is supplied to the coil 2, it is preferable to stably hold on the aperture portion the ND filter which has an intermediate density, and is frequently used. If this adjustment is done, power consumption can be reduced.

Figure 14:
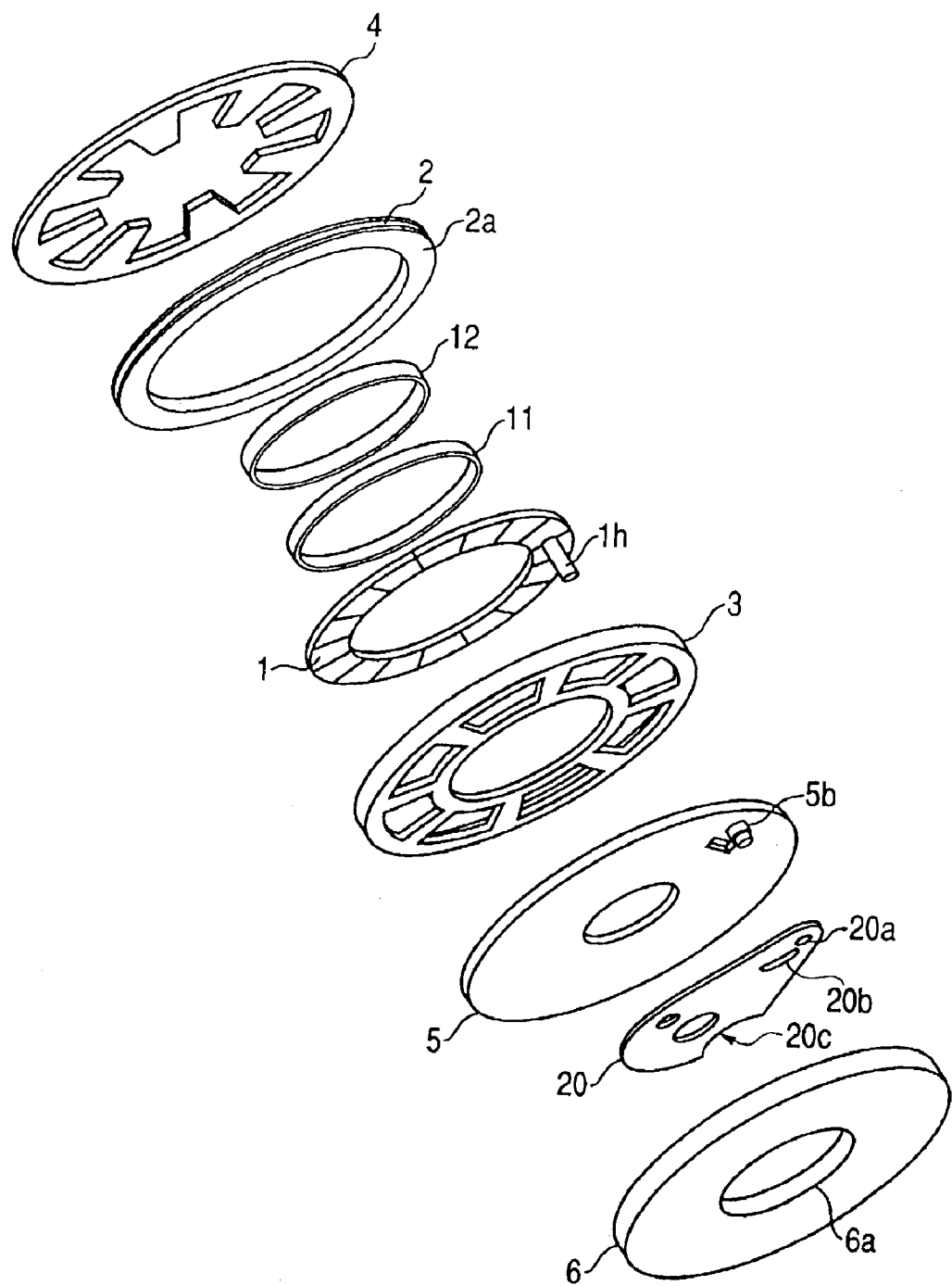
FIG. 14 is a disassembled perspective view illustrating a third embodiment of a light-amount regulating apparatus according to the present invention.

FIG. 14 is a disassembled perspective view illustrating a third embodiment of a light-amount regulating apparatus according to the present invention. In FIG. 14, portions having equivalent functions to those of the first embodiment are designated by the same reference numerals as those of the first embodiment, and detailed description thereof will be omitted.

In the third embodiment, a movable stop aperture plate with plural aperture portions having different diameters is used in place of the ND filter plate 13 in the second embodiment.

In FIG. 14, reference numeral 20 designates the stop aperture plate which is formed of plastics or metal having light intercepting characteristic. A round hole 20a of the stop aperture plate 20 rotatably engages with the pin 5b of the plate 5, and an elongate hole 20b slidably engages with the driving pin 1h of the magnet 1. When the magnet 1 is rotated, the stop aperture plate 20 is pushed by the driving pin 1h, and rotated about the round hole 20a engaging with the pin 5b. The aperture portion 20c of the stop aperture plate 20 disposed in front of the aperture portion 5a of the plate 5 is thereby changed over such that the amount of light passing through the aperture portion 5a can be regulated.

Also in this embodiment, when no current is supplied to the coil 2, it is preferable to stably hold on the aperture portion 5a the aperture portion 20c of the stop aperture plate 20 which is most frequently used. If this adjustment is done, power consumption can be reduced.

Figure 15:
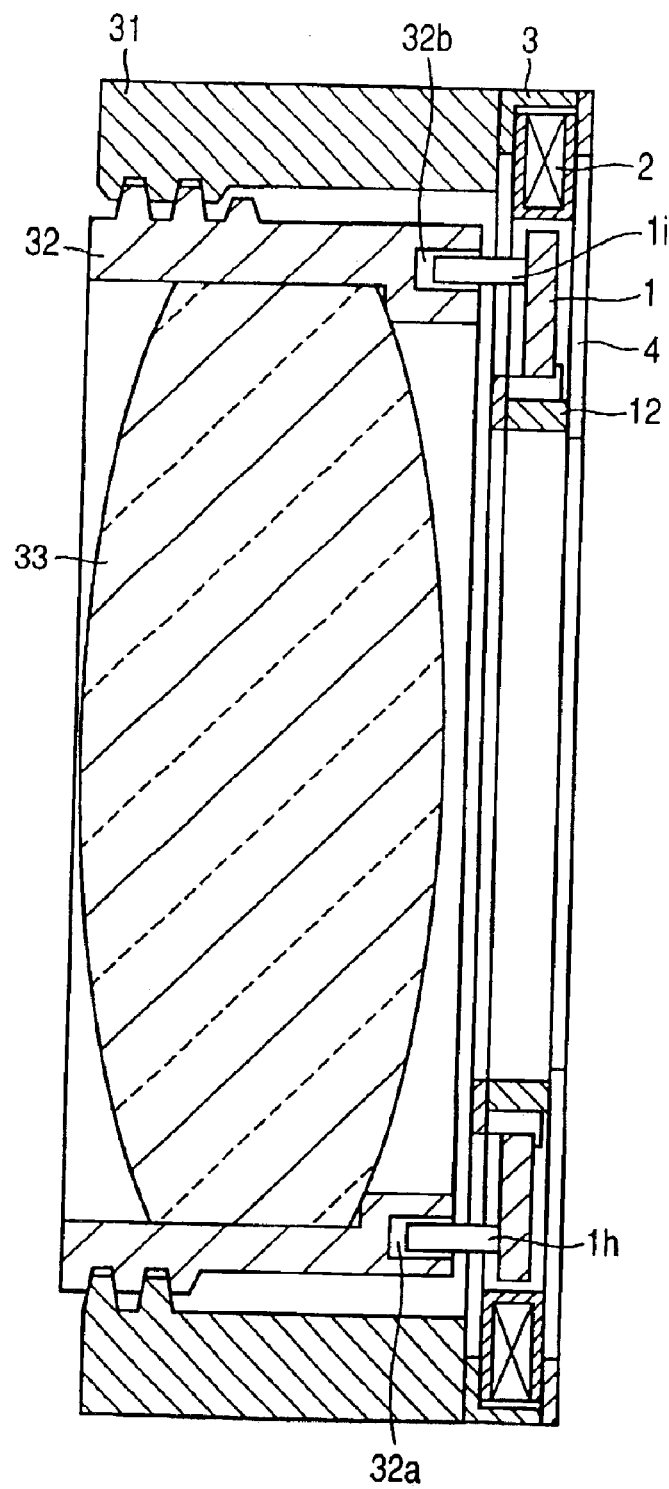
FIG. 15 is a cross-sectional view illustrating a fourth embodiment of a lens driving apparatus according to the present invention.
Figure 16:
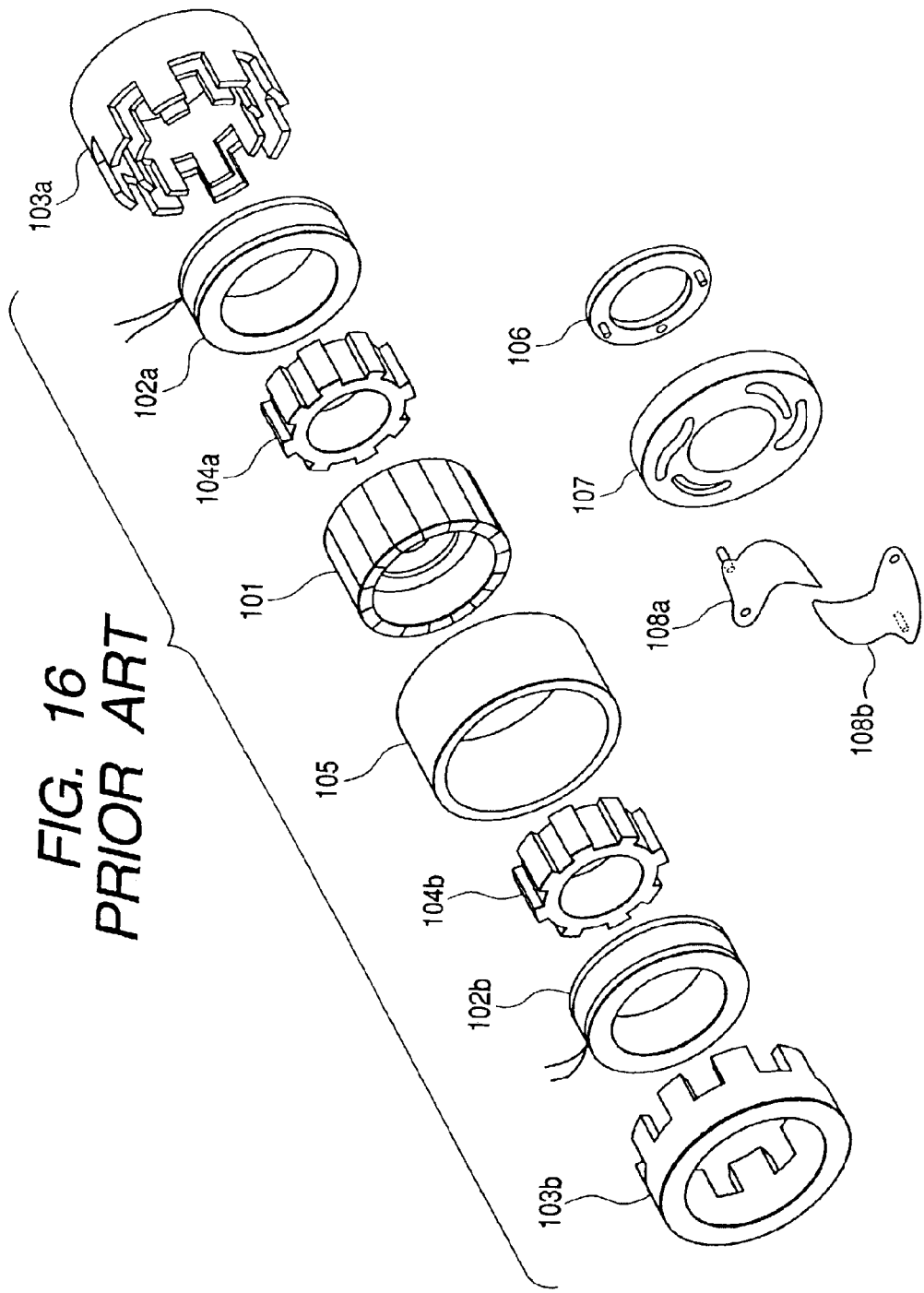
FIG. 16 is a disassembled perspective view illustrating a conventional shutter blade driving apparatus.
Figure 17:
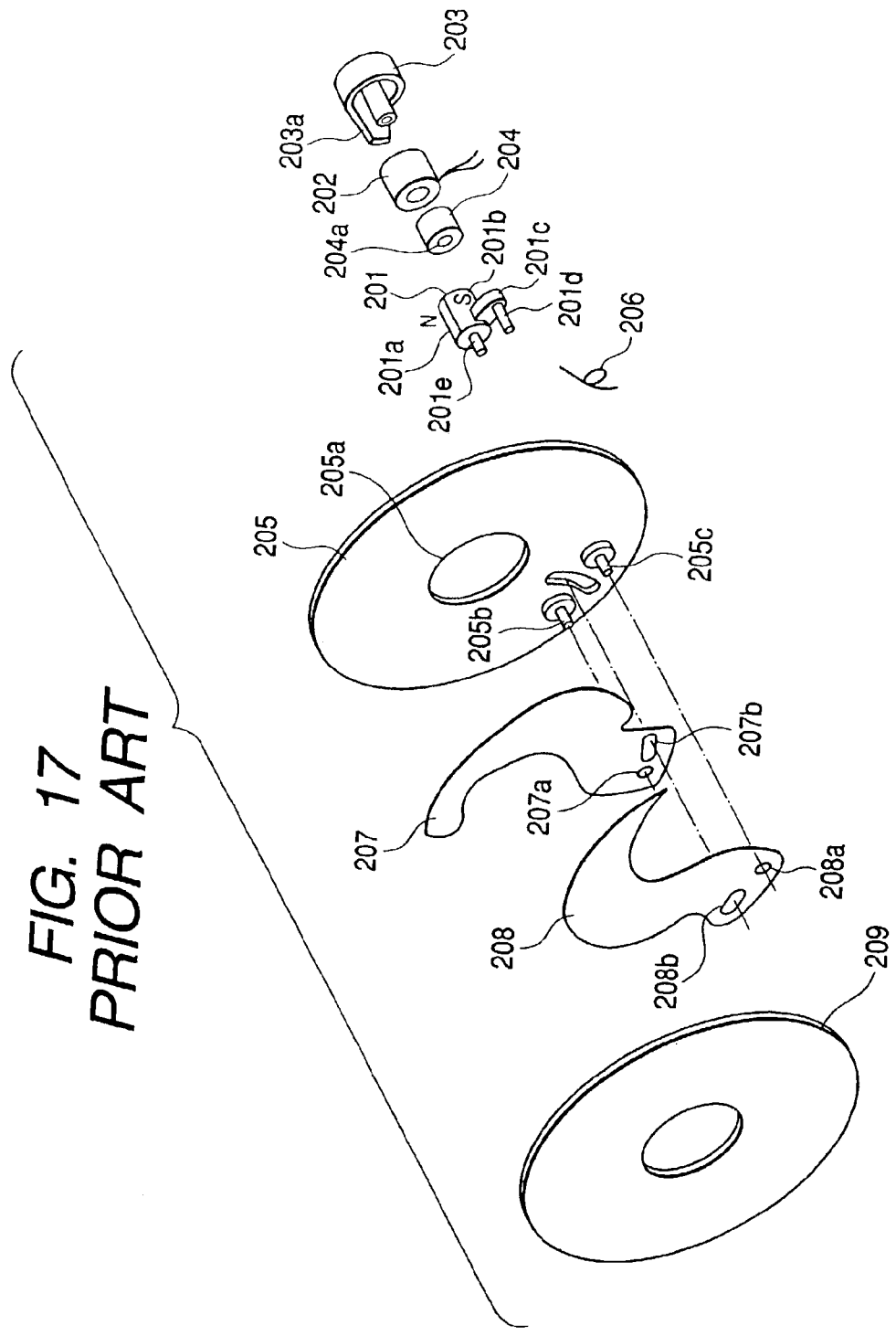
FIG. 17 is a disassembled perspective view illustrating another conventional shutter blade driving apparatus.

FIG. 15 is a cross-sectional view illustrating a fourth embodiment of a lens driving apparatus according to the present invention. In FIG. 15, portions having equivalent functions to those of the first embodiment are designated by the same reference numerals as those of the first embodiment, and detailed description thereof will be omitted.

The fourth embodiment relates to an apparatus in which the position of a lens can be readily switched between three stop positions by using the driving apparatus used in the above embodiments.

Reference numeral 31 designates a cylindrical lens-barrel member. A female helicoidal portion is formed on its inner circumferential portion, and the first stator 3 is fixed to the lens-barrel member 31. Reference numeral 32 designates a lens holding member for holding the lens disposed in the inner circumferential portion of the lens-barrel member 31. A male helicoidal portion is formed on its outer circumferential portion, and the male helicoidal portion rotatably engages with the female helicoidal portion of the lens-barrel member 31. Round holes 32a and 32b are formed in the lens holding member 32, and the driving pins 1h and 1i of the magnet 1 engage with the round holes 32a and 32b, respectively.

When the magnet 2 is rotated, the lens holding member 32 is guided by the driving pins 1h and 1i, and rotated. Accordingly, the lens holding member 32 and the lens 33 are moved in a direction of its optical axis due to interaction between the male helicoidal portion and the female helicoidal portion. The focal length of a light beam passing through the central portion of the magnet 1 can be hence changed. Lengths of the driving pins 1h and 1i need to have sufficient values that can maintain the engagement condition even when the lens holding member 32 moves in the direction of its optical axis.

In the above-discussed embodiments, the number of magnetic poles of the magnet is sixteen, but modified structures can have at least two magnetic poles including one N pole and one S pole. Similarly, the first magnetic pole portions and the second magnetic pole portions are comprised of gear configurations with plural teeth, respectively, but modified structures can have at least one gear-shaped magnetic pole portion facing two poles of the N pole and the S pole in the magnet.

As described in the foregoing, according to the above embodiments, the rotational condition of the magnet can be selectively determined from three states by changing the current supply condition of the coil in the driving apparatus between no current supply state, positive current supply state, and reverse (negative) current supply state. Therefore, it is also possible to selectively set from three states the condition of a member which is to be driven in interlocking relationship with the rotation of the magnet.

What is claimed is:

1. A driving apparatus comprising:
    a rotatable rotor with a ring shape, said rotor having magnet portions which are divided along a circumferential direction and differently magnetized;
    a first magnetic pole portion, said first magnetic pole portion being formed extending in a direction perpendicular to a rotational axis of said rotor, and facing a face of said magnet portion perpendicular to the rotational axis;
    a second magnetic pole portion, said second magnetic pole portion sandwiching said magnet portion between said second magnetic pole portion and said first magnetic pole portion, and facing another face of said magnet portion perpendicular to the rotational axis; and
    a coil for magnetically exciting said first magnetic pole portion and said second magnetic pole portion, said coil being disposed radially of said rotor;
    wherein a condition of $-0.333X+0.9<Y$ is satisfied where Y is a ratio of a central angle of each first magnetic pole portion relative to a central angle of each magnetized pole in said magnet portion, and X is a ratio of an outer circumferential length of each magnetized pole in said magnet portion relative to a thickness of said magnet portion in a direction of the rotational axis; and
    wherein a rotational position of said rotor can be selectively changed to one of three positions by selecting one of a state in which no current is supplied to said coil, a state in which current in a predetermined direction is supplied to said coil, and a state in which current in a direction opposite to the predetermined direction is supplied to said coil.

2. A driving apparatus according to claim 1, further comprising a regulating member, said regulating member regulating a rotational range of said rotor such that this rotational range includes regions in which directions of attractive force due to magnetic force acting between said magnet portion and said first magnetic pole portion are opposite to each other, but does not include a region in which a center of said magnetized pole in said magnet portion faces a center of said first magnetic pole direction.

3. A light-amount regulating apparatus comprising:
    a rotatable rotor with a ring shape, said rotor having magnet portions which are divided along a circumferential direction and differently magnetized;
    an output member, said output member being actuated according to rotation of said rotor;
    a first magnetic pole portion, said first magnetic pole portion being formed extending in a direction perpendicular to a rotational axis of said rotor, and facing a face of said magnet portion perpendicular to the rotational axis;
    a second magnetic pole portion, said second magnetic pole portion sandwiching said magnet portion between said second magnetic pole portion and said first magnetic pole portion, and facing another face of said magnet portion perpendicular to the rotational axis;
    a coil for magnetically exciting said first magnetic pole portion and said second magnetic pole portion, said coil being disposed radially of said rotor;
    a plate having an aperture portion; and
    a light-amount regulating member for changing the amount of light passing through said aperture portion, said light-amount regulating member being driven by said output member, and moved on said aperture portion of said plate;
    wherein a condition of $-0.333X+0.9<Y$ is satisfied where Y is a ratio of a central angle of each first magnetic pole portion relative to a central angle of each magnetized pole in said magnet portion, and X is a ratio of an outer circumferential length of each magnetized pole in said magnet portion relative to a thickness of said magnet portion in a direction of the rotational axis; and
    wherein a rotational position of said rotor can be selectively changed to one of three positions by selecting one of a state in which no current is supplied to said coil, a state in which current in a predetermined direction is supplied to said coil, and a state in which current in a direction opposite to the predetermined direction is supplied to said coil.

4. A light-amount regulating apparatus according to claim 3, further comprising a regulating member, said regulating member regulating a rotational range of said rotor such that this rotational range includes regions in which directions of attractive force due to magnetic force acting between said magnet portion and said first magnetic pole portion are opposite to each other, but does not include a region in which a center of said magnetized pole in said magnet portion faces a center of said first magnetic pole portion.

5. A light-amount regulating apparatus according to claim 3, wherein said rotor can be held at a first rotational position by attractive force due to magnetic force acting between said magnet portion and said first magnetic pole portion when no current is supplied to said coil, and can be selectively held at one of a second rotational position and a third rotational position which are rotated from the first rotational position in mutually opposite directions, according to a direction of current supplied to said coil.

6. A light-amount regulating apparatus according to claim 5, wherein said light-amount regulating member changes its aperture diameter according to the rotational position of said rotor, and the aperture diameter has a maximum diameter when said rotor is in the second rotational position, a minimum diameter when said rotor is in the third rotational position, and an intermediate diameter between the maximum diameter and the minimum diameter when said rotor is in the first rotational position.

7. A lens driving apparatus comprising:
- a rotatable rotor with a ring shape, said rotor having magnet portions which are divided along a circumferential direction and differently magnetized;
- a first magnetic pole portion, said first magnetic pole portion being formed extending in a direction perpendicular to a rotational axis of said rotor, and facing a face of said magnet portion perpendicular to the rotational axis;
- a second magnetic pole portion, said second magnetic pole portion sandwiching said magnet portion between said second magnetic pole portion and said first magnetic pole portion, and facing another face of said magnet portion perpendicular to the rotational axis;
- a coil for magnetically exciting said first magnetic pole portion and said second magnetic pole portion, said coil being disposed radially of said rotor;
- a lens, a light beam passing said lens passing through a central portion of said rotor; and
- a lens holding member for holding said lens, said lens holding member being moved in a direction of an optical axis of said lens according to rotation of said rotor;

wherein a condition of $-0.333X+0.9<Y$ is satisfied where Y is a ratio of a central angle of each first magnetic pole portion relative to a central angle of each magnetized pole in said magnet portion, and X is a ratio of an outer circumferential length of each magnetized pole in said magnet portion relative to a thickness of said magnet portion in a direction of the rotational axis; and wherein a rotational position of said rotor can be selectively changed to one of three positions by selecting one of a state in which no current is supplied to said coil, a state in which current in a predetermined directions is supplied to said coil, and a state in which current in a direction opposite to the predetermined direction is supplied to said coil.

8. A lens driving apparatus according to claim 7, further comprising a regulating member, said regulating member regulating a rotational range of said rotor such that this rotational range includes regions in which directions of attractive force due to magnetic force acting between said magnet portion and said first magnetic pole portion are opposite to each other, but does not include a region in which a center of said magnetized pole in said magnet portion faces a center of said first magnetic pole portion.

9. A lens driving apparatus according to claim 7, wherein said rotor can be held at a first rotational position by attractive force due to magnetic force acting between said magnet portion and said first magnetic pole portion when no current is supplied to said coil, and can be selectively held at one of a second rotational position and a third rotational position which are rotated from the first rotational position in mutually opposite directions, according to a direction of current supplied to said coil.

* * * * *

UNITED STATES PATENT AND TRADEMARK OFFICE
CERTIFICATE OF CORRECTION

PATENT NO. : 6,860,655 B2  Page 1 of 1
DATED : March 1, 2005
INVENTOR(S) : Makoto Miyawaki It is certified that error appears in the above-identified patent and that said Letters Patent is hereby corrected as shown below:

Column 6,
Line 48, delete "FIG. 3" and insert -- In FIG. 3 --.

Signed and Sealed this

Twenty-eighth Day of March, 2006

JON W. DUDAS
*Director of the United States Patent and Trademark Office*